UNITED STATES PATENT OFFICE.

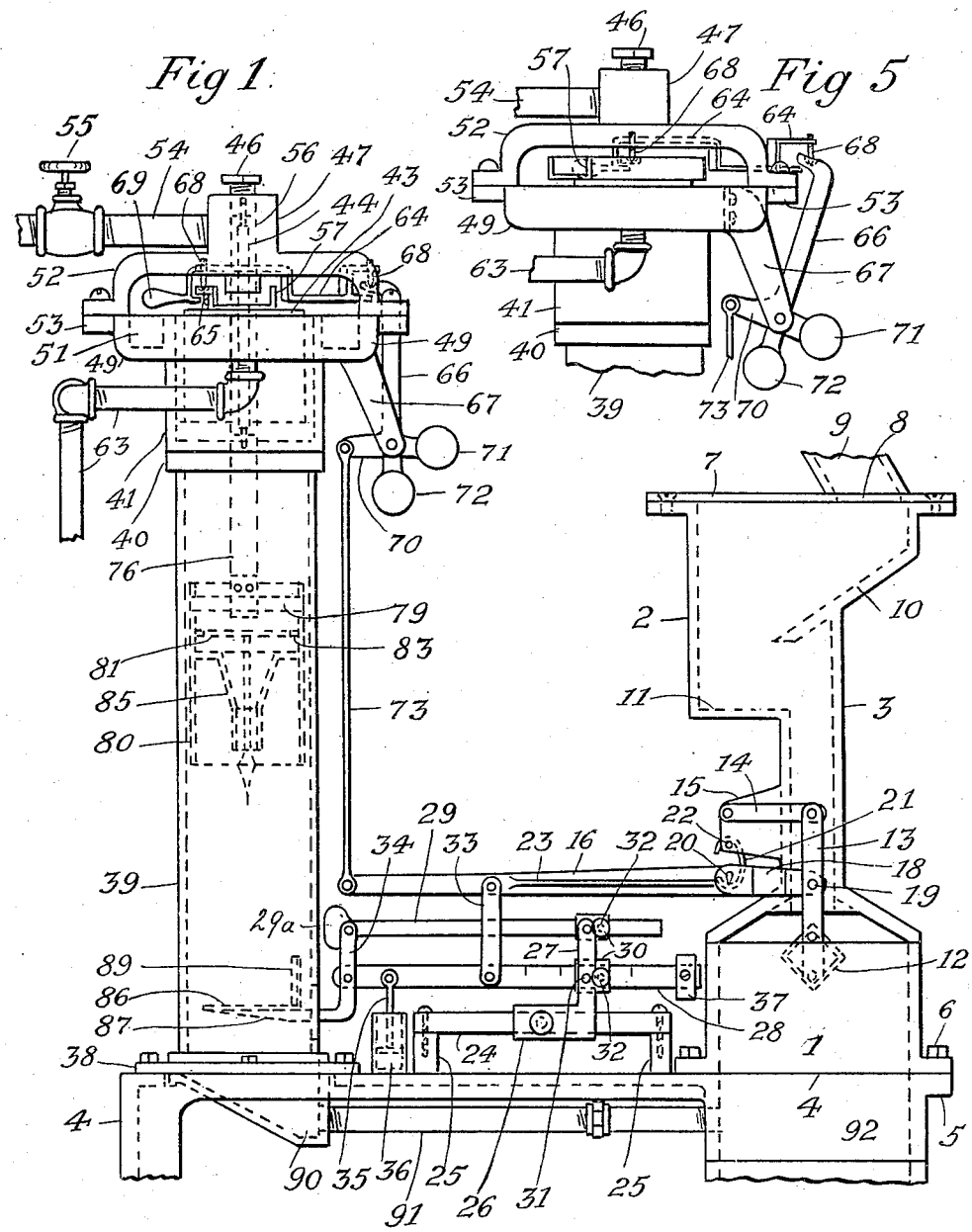
K. DOUGAN.
WHEAT WETTING DEVICE.
APPLICATION FILED JULY 19, 1907.
903,961.
Patented Nov. 17, 1908.
4 SHEETS—SHEET 1.
Witnesses:
Theo. Laygaard
H. A. Bowman.
Inventor:
Kennedy Dougan
By P. H. Gunckel
his Attorney.

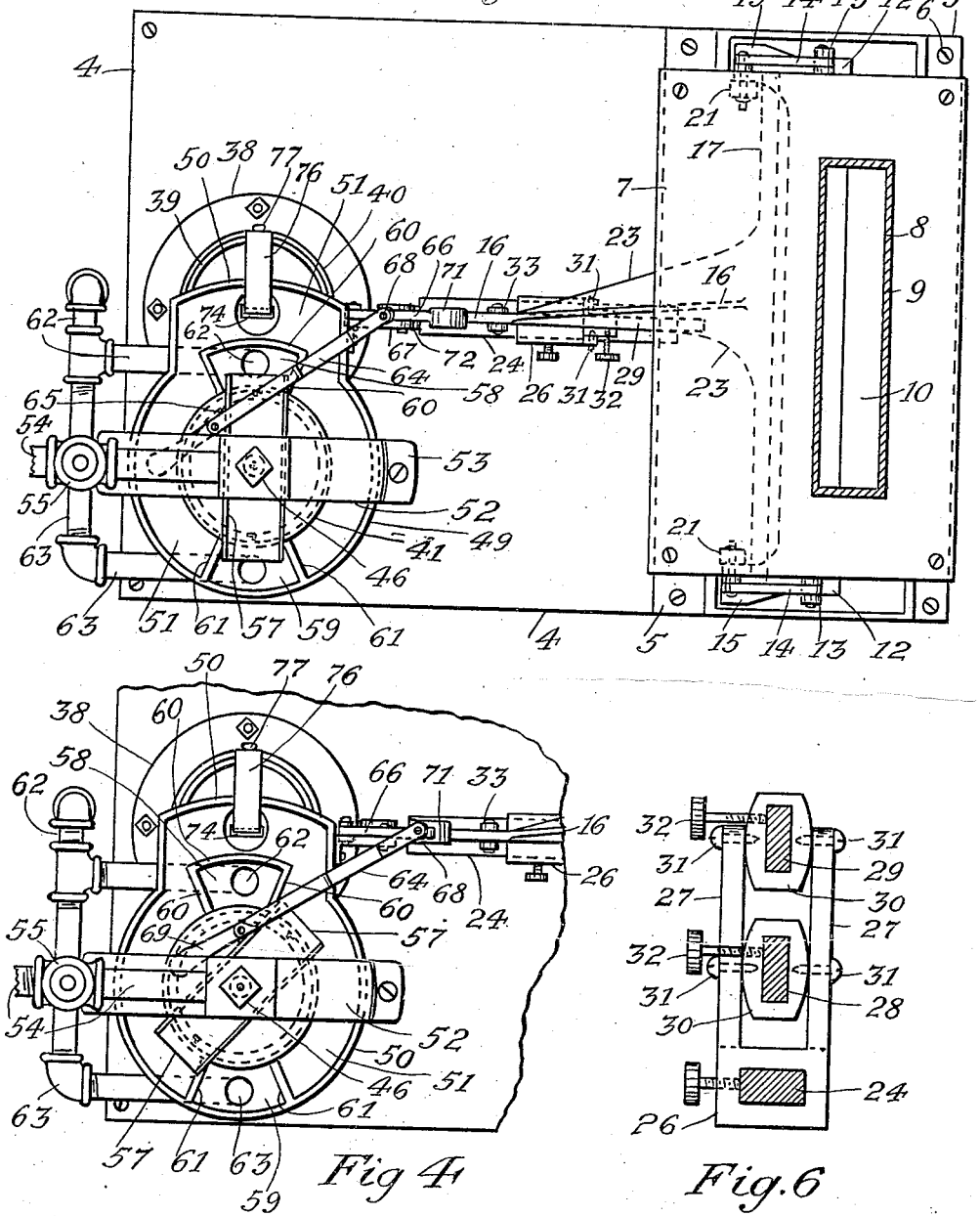

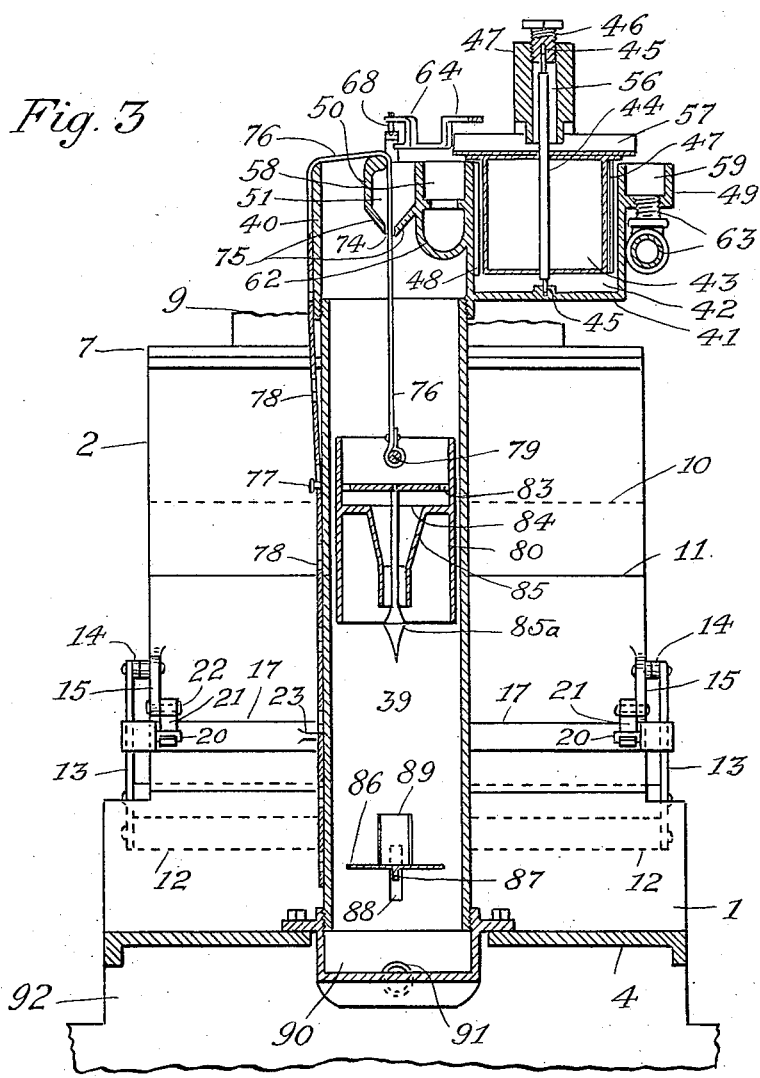

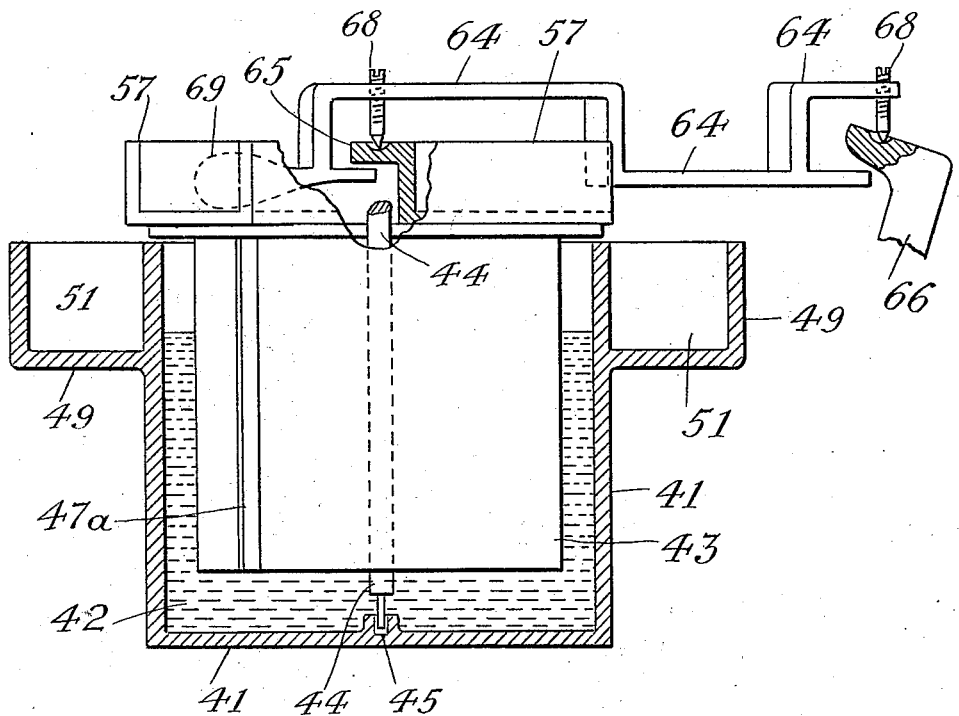

KENNEDY DOUGAN, OF MINNEAPOLIS, MINNESOTA.

WHEAT-WETTING DEVICE.

No. 903,961.

Specification of Letters Patent.

Patented Nov. 17, 1908.

Application filed July 19, 1907. Serial No. 384,522.

*To all whom it may concern:*

Be it known that I, KENNEDY DOUGAN, a citizen of the United States, residing at Minneapolis, in the county of Hennepin and State of Minnesota, have invented certain new and useful Improvements in Wheat-Wetting Devices, of which the following is a specification.

My invention relates to apparatus for wetting wheat preparatory to grinding.

The objects of the invention are, first, to furnish practical means for automatically increasing or decreasing the proportion of water to wheat so that the proportions will be constant regardless of the variations in the quantity of wheat supplied to the apparatus; second, to provide automatic means for shutting off the flow of the water when the supply of wheat to the apparatus ceases;
and, third, to so construct the apparatus that the desired flow of water will not be affected by the presence of foreign substances therein.

In the apparatus in common use for wetting wheat the flow of water is frequently shut off partially or entirely by small substances carried in suspension by the water finding their way into and obstructing the small supply orifice; and this objectionable condition is avoided in the present apparatus. And, again, in the apparatus commonly used, the flow of wheat sometimes ceases while the flow of water continues and does damage; and this objection is also overcome by my improved apparatus.

My improvements are illustrated in the accompanying drawings, in which—

Figure 1 is a side elevation of the improved apparatus; Fig. 2 is a plan view of the same; Fig. 3 is a vertical sectional view of Fig. 1, looking toward the right; Fig. 4 is a plan view of the water-supplying devices and shows their relative positions when water is flowing through the apparatus;
Fig. 5 shows the same parts as Fig. 4 in elevation; Fig. 6 is an enlarged vertical section on the broken line z—z of Fig. 1, showing portions of the regulating levers and their adjustable fulcrum, and Fig. 7 is an enlarged side view, partly in section, of the devices for regulating the water inflow.

In the drawings 1 designates the body of the machine, 2 the grain hopper, and 3 the upright chute connecting the latter with the former. The body may be secured to a base 4 by means of lugs 5 and bolts 6. The hopper has a cover 7 in which is a relatively long opening 8 to receive the grain spout 9; and a cant-board 10 in the upper portion near one side directs the grain to a retarding shelf 11 at the opposite side, for regulating the velocity of the grain which descends thence through the neck 3 into the main casing 1. In the base 4 is formed a chamber into which the grain falls and in such chamber there may be a conveyer, or other means may be supplied, for conducting away the grain that has descended and the water that is supplied to it; but such devices form no part of the present improvements.

In the casing 1, which preferably is rectangular and oblong, is suspended a hollow angular box 12 with one of its angles at the top, so that the adjacent sides will serve as deflectors for the falling grain; and the box serves the further purpose of a balance in the system of levers for controlling the flow of water. The grain in descending from the hopper to the main chamber falls upon the box 12 and the force of its impact is transmitted to the box hangers. The ends of the box are attached to the vertical hangers 13, the upper ends of which are pivoted to horizontal bars 14, and the latter are pivoted to lugs 15 on the opposite ends of the chute 3.

A T-shaped lever, composed of a body portion 16 and the lateral arms 17, is arranged with its arms extending across the width of the neck 3 and these arms have short arms 18 extending parallel with the lever body 16 and which are pivoted at 19 to the hangers 13. On projections from the arms 17, at the bases of the arms 18, are formed or secured knife-edge pivots 20 which serve to fulcrum the lever on swinging links 21 hung from pins 22 projecting inward from the flanges 15. To render the lever light but strong, webs 23 connect the body 16 with the arms 17. The lever 16 is connected with and controls the devices for admitting water to the apparatus.

On the base 4 beneath the lever 16 is a guide-bar 24 supported on posts 25 on which bar is mounted a slidable block 26 having upright standards 27, constituting, as a whole, an adjustable fulcrum support for the system of levers. Between the standards 27 are fulcrumed two levers 28 and 29 by means of collars 30 pivotally supported on the standards by screws or pins 31; and both levers are slidable for adjustment in their respective collars and are held in positions of adjustment by set-screws 32. The lower lever 28 is connected by a pair of links 33 to the lever 16; and the levers 28 and 29 are connected at their outer ends by a link 34. Near this link to the arm of the lever 28 is connected a rod 35 which carries a piston in a dash-pot 36 containing a suitable liquid, for easing the lever movements. The other arm of the lever 28 is provided with an adjustable counter-weight 37. On the base 4 is secured by means of a flange 38 and bolts an upright hollow cylinder 39, on the top of which is screwed or otherwise secured a hollow head 40. At one side of the head is formed or secured a cylindrical body 41 providing a chamber 42 containing a suitable liquid, and a tight cylinder 43 floats in the liquid. This float 43 has a rod 44 passing axially through it and the ends of the rod are loosely guided in sockets 45, one in the bottom of the body 41, and the other in a screw-plug 46 which is adjustable in a hollow stud 47 above the body 41. A vertical flange or wing 47$^a$ is provided on the side of the float 43 and a similar flange 48 is provided on the inner wall of the cylinder 41, the flanges serving to retard the rotation of the float. The body 41 has a flaring circular top 49 which has a lateral portion 50 projecting into the chamber of the cylinder cap 40, and provides a nearly circular water chamber 51. A bridge-tree 52 extends across and is bolted to flanges 53 on the top 49, and the hollow stud 47 is formed on the bridge-tree. The inlet water-pipe 54, which is provided with a valve 55, is in communication with the vertical opening 56 in the stud 47. Beneath this opening is an open-end trough 57 into which the water descends through the opening 56. The rod 44 passes through this trough and is secured to it, so that when the trough is turned on its axis the float 43 in the chamber or dash-pot 42 must turn with it, whereby the movements of the trough are somewhat retarded and steadied.

When wheat is not flowing the position of the trough is that shown in Figs. 1, 2, and 3, and while wheat is flowing the trough position is as shown in Figs. 4 and 5. In the former instance the trough discharges the water into pockets 58 and 59 formed by partitions 60 and 61 in the water-chamber 51; and waste pipes 62 and 63 carry away the water thus discharged. To enable the trough to be turned to position to discharge into the chamber 51, a lever 64 is connected to a lug 65 near one end of the trough, and the other end of the lever is connected to the upper horizontal portion of a lever 66 that is fulcrumed to a bracket 67 depending from the part 49. The lever or bar 64 is fulcrumed on the points of adjustable pins 68 engaging in sockets in the lug 65 and lever-arm 66, and carries a counter-weight 69 on its inner end. The lever 66 has its lower arm 70 extending horizontally in one direction and a counter-weight 71 extending in opposite direction, and another counter-weight 72 on the lower end of the vertical arm. The lateral arm 70 of the water-control lever 66 is connected by a vertical rod 73 to the free end of the lever 16, so that the weight of falling grain on the box 12 will serve to raise the end of the lever 16 to which the rod is connected and thus rock the lever 66 on its fulcrum and thereby swing the trough 57 on its axis to cause it to discharge the water into the chamber 51.

In the bottom of the cap extension 50 is an elongated slot 74 between converging depending lips 75, through which opening water may flow from the chamber 51 into the top of the cylinder 39. A leather or other suitably flexible strap 76 is passed loosely through the slot 74, its upper portion resting on the cap 40 and extension 50 and its body portion extending downward at the side of the cylinder and held in place by a button 77 engaging in one of the holes 78 in the strap; and the inner end of the strap is attached centrally to a cross-bar 79 in a short cylinder 80, for suspending the latter loosely within the main cylinder 39. The strap may be moved upward or downward and held in place by the button 78 for adjusting the position of the cylinder 80 in the cylinder 39, to regulate the height from which the water will fall that is discharged from the cylinder 80. In the latter cylinder are upper and lower horizontal partitions 81 and 82, the former having openings 83 near the sides and the latter a central opening 84 with which a funnel-shaped discharge spout 85 is connected. The partition 81 serves to check the velocity of the water descending from the slot 74, so that whatever may be the position of the cylinder 80 the velocity of the water falling into the lower portion of the cylinder 39 is determined by the height of the funnel 85.

Near the bottom of the cylinder 39 is a platform 86 arranged to receive the water that drips or flows from the funnel, and this platform is carried on the end of a lateral arm 87 formed on the lever link 34. A slot 88 in the wall of the cylinder permits vertical play of the arm, and an upright plate 89 on the side of the platform prevents water from splashing from the platform through the slot. The water that flows off the platform falls into a chamber 90 whence it is conducted by a pipe 91 to a chamber 92 beneath the grain box 1, where the grain and water may be mingled and conducted away by a screw-conveyer or other device.

In practice, before the grain is supplied the levers and the parts they carry are in equilibrium. Grain then fed into the machine falls through the neck 3 upon the box 12 and its impact depresses the box, with the result of lowering the adjacent end of the lever 16 and raising its outer arm thereby lifting the rod 73; and the latter movement serves to rock the lever 66 on its fulcrum, which results in pulling outward the lever 64 and swinging the trough 57 laterally into position to conduct water into the main chamber 51. Thereupon the water is free to flow out of the slot 74 and descend to the cylinder partition 81 and thence to the partition 82 and to fall from the funnel 85 upon the platform 86.

The impact of the water falling upon this platform 86 attached to one end of the system of levers tends to counteract the effect of the grain falling upon the box 12 attached to the other end of the system. The greater the volume and weight of the grain fed upon the box 12 the more the box will be depressed and the rod 73 raised, resulting in a further swinging of the trough 57 and the feeding of an increased amount of water into the chamber 51. Thus as a greater quantity of grain is fed into the machine a correspondingly greater amount of water is also automatically supplied to the grain.

The proportion of water to grain may be regulated as desired by adjusting the fulcrums by moving the block 26; or by varying the height from which the water falls from the spout 85, by adjustment of the strap 76; or by making both such adjustments. After the adjustment is made the proportionate supply of water to grain will remain constant, whether the feed of grain is increased or decreased.

Having described my invention, what I claim and desire to secure by Letters Patent is—

1. In a grain-wetting device, a counterpoised system of levers supporting at different points devices for receiving respectively the impact of descending grain and water, and means for causing the impact of the grain on the one device to control the impact and flow of water upon the other device, substantially as set forth.

2. In a grain-wetting device, a counterpoised system of levers supporting at different points devices for receiving respectively the impact of descending grain and water, means for causing the impact of the grain on the one device to control the impact and flow of water upon the other device, and means for regulating the proportionate quantity of water supplied to the grain, substantially as set forth.

3. In a grain-wetting device, a counterpoised system of levers supporting at different points devices for receiving respectively the impact of descending grain and water, means for adjusting the lever fulcrums, and means for causing the impact of the grain on the one device to control the impact and flow of water upon the other device, substantially as set forth.

4. In a grain-wetting device, a counterpoised system of levers supporting at different points devices for receiving respectively the impact of a continuous stream of descending grain and water, means for causing the impact of the grain on the one device to control the impact and flow of water upon the other device, and means for regulating the height of the fall of the water, substantially as set forth.

5. In a grain-wetting device, a counterpoised system of levers supporting at different points devices for receiving respectively the impact of descending grain and water, and automatic means actuated by the movement of said levers by the impact of a continuous flow of grain on the grain receiver to cause water to flow continuously in a regulated stream onto the water receiver, substantially as set forth.

6. In a grain-wetting device, a counterpoised system of levers supporting at different points devices for receiving respectively the impact of descending grain and water, automatic means actuated by the movement of said levers by the impact of the grain to cause water to flow continuously onto the water receiver, and means for regulating the height from which the water falls to its receiver, substantially as set forth.

7. In a grain-wetting device, a counterpoised system of levers supporting at different points devices for receiving respectively the impact of descending grain and water, automatic means actuated by the movement of said levers by the impact of the grain to cause water to flow continuously onto the water receiver, and means for regulating the quantity of water permitted to flow and the height from which it falls to its receiver, substantially as set forth.

8. In a grain-wetting device, a counterpoised system of levers, means for adjusting their fulcrums, separate chambers for the descent of grain and water, a common chamber into which both discharge, devices carried at the opposite ends of said levers for respectively receiving the impact of descending grain and water, means for feeding the grain and water in continuous streams into their respective chambers, and means operated by said levers for regulating the quantity of water permitted to flow into the water chamber, substantially as set forth.

9. In a grain-wetting device, a counterpoised system of levers, means for adjusting their fulcrums, separate chambers for the descent of grain and water, a common chamber into which both discharge, devices carried at the opposite ends of said levers for respectively receiving the impact of descending grain and water, means for suitably feeding the grain and water into their respective chambers, and means operated by said levers for regulating the quantity of water permitted to flow into the water chamber, substantially as set forth.

10. In a grain-wetting device, a counterpoised system of levers, means for adjusting their fulcrums, separate chambers for the descent of grain and water, a common chamber into which both discharge, devices carried at the opposite ends of said levers for respectively receiving the impact of descending grain and water, means for suitably feeding the grain and water into their respective chambers, means operated by said levers for regulating the quantity of water permitted to flow into the water chamber, and means for varying the height from which the water descends to its receiver, substantially as set forth.

11. In a grain-wetting device, a counterpoised system of levers, means for adjusting their fulcrums, separate chambers for the descent of grain and water, a common chamber into which both discharge, devices carried at the opposite ends of said levers for respectively receiving the impact of descending grain and water, means for feeding the grain and water with uniform velocity into their respective chambers, and means operated by said levers for regulating the quantity of water permitted to flow into the water chamber, substantially as set forth.

12. In a grain-wetting device, a counterpoised system of levers, means for adjusting their fulcrums, separate chambers for the descent of grain and water, a common chamber into which both discharge, devices carried at the opposite ends of said levers for respectively receiving the impact of descending grain and water, means for feeding the grain and water in continuous streams into their respective chambers, means operated by said levers for regulating the quantity of the water permitted to flow, and means for regulating the height of its fall, substantially as set forth.

13. In a grain-wetting device, a counterpoised system of levers, means for adjusting their fulcrums, separate chambers for the descent of grain and water, a dash-pot connected with said levers for easing their movements, means for feeding the grain and water with uniform velocity into their respective chambers, and means operated by said levers for regulating the quantity of water permitted to flow into the water chamber, substantially as set forth.

14. In a mixing apparatus, a counterpoised system of levers supporting at different points devices for receiving the impact of flowing material, means for causing a continuous flow of material onto one of such receiving devices, and means for causing the impact of material thereon to produce and regulate a continuous flow of material onto the other receiving device, substantially as set forth.

In testimony whereof I have signed my name to this specification in the presence of two subscribing witnesses this 3rd day of July 1907.

KENNEDY DOUGAN.

Witnesses:
  P. H. GUNCKEL,
  H. A. BOWMAN.